United States Patent [19]

Tokarz

[11] 4,365,229
[45] Dec. 21, 1982

[54] HIGH TEMPERATURE SENSOR

[75] Inventor: Richard D. Tokarz, West Richland, Wash.

[73] Assignee: The United States of America as represented by the United States Department of Energy, Washington, D.C.

[21] Appl. No.: 229,421

[22] Filed: Jan. 29, 1981

[51] Int. Cl.³ .............................................. H01C 7/04
[52] U.S. Cl. ....................................... 338/25; 338/28
[58] Field of Search ..................... 338/25, 27, 28, 229; 73/362 AR, 342; 340/584; 361/282, 321

[56] References Cited

U.S. PATENT DOCUMENTS 2,676,196  4/1954  Marsden, Jr. ................... 338/229 X
2,710,899  6/1955  Marsden, Jr. et al. ..... 73/362 AR X
2,996,696  8/1961  Harman ............................. 73/342 X Primary Examiner—C. L. Albritton

[57] ABSTRACT

A high temperature sensor includes a pair of electrical conductors separated by a mass of electrical insulating material. The insulating material has a measurable resistivity within the sensor that changes in relation to the temperature of the insulating material within a high temperature range (1,000 to 2,000 K.). When required, the sensor can be encased within a ceramic protective coating.

9 Claims, 6 Drawing Figures

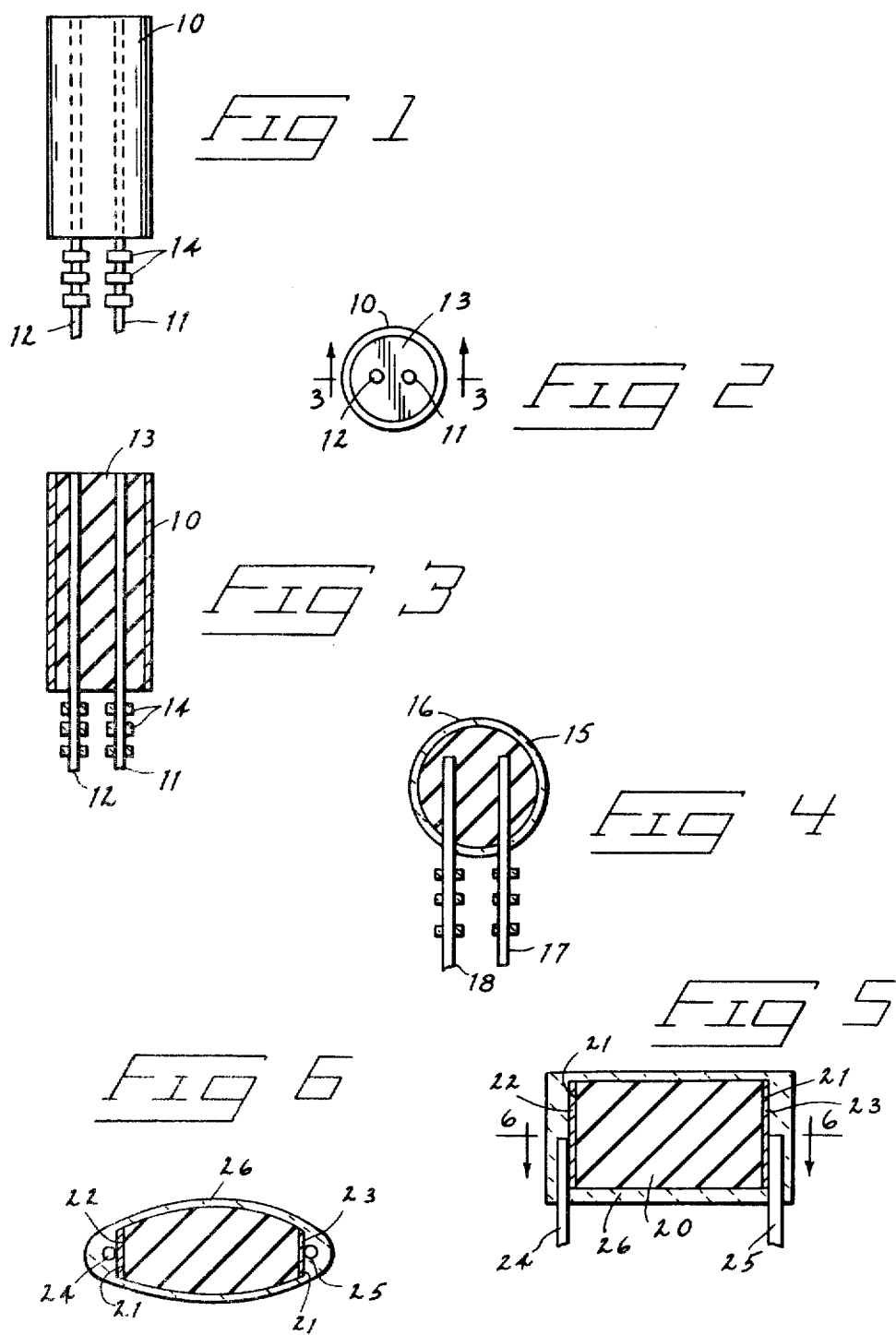

HIGH TEMPERATURE SENSOR

The U.S. government has rights in this invention pursuant to Contract No. EY-76-C-06-1830 between the U.S. Department of Energy and Battelle Memorial Institute.

BACKGROUND OF THE INVENTION

This disclosure relates to sensors for detecting very high temperatures. It is specifically directed to devices for continuously measuring temperature in the range of 1,000 to 2,000 K., which might occur during operation or testing of nuclear or fusion reactors.

This invention arose from tests requiring a direct indication of temperature within nuclear reactors. It meets instrumentation requirements for control room indication of very high temperatures needed in the monitoring of operational parameters to protect against damaging fuel rod conditions that might otherwise remain undetected.

The present invention arose in response to a need for direct continuous measurement of temperatures higher than can be monitored by existing immersion devices. The highest temperatures which can be measured by an immersion device today is between 1700 to 1800 K. (1427° to 1527° C.). Even these measurements can only be accomplished by use of extremely expensive tungsten-rhenium thermocouples. Current scientific research relating to fusion reactions and other test efforts relating to nuclear reactors and monitoring of loss of coolant accidents have intensified the need to directly monitor higher and higher temperatures. The present invention provides a relatively inexpensive device for accurately measuring these temperatures in a direct fashion.

The present device consists of two electrical conductors separated by a mass of electrical insulating material having a measurable resistivity change in relation to its temperature within the high temperature range to be monitored. By monitoring the electrical resistance across the conductors through the mass of insulation material, one can be provided with a direct reading of temperature changes in a very high range of temperatures.

SUMMARY OF THE INVENTION

The disclosed sensor essentially comprises a pair of electrical conductors each having a melting point above the temperature range to be monitored. A mass of electrical insulating material separates the conductors. The mass of insulating material has a measurable resistivity change in relation to its temperature within the temperature range to be monitored. The sensor can be fabricated as a sheathed length of cable, a sphere, a flattened disk or in any other discrete shape compatible with the environment within which it is to be used. Environmental conditions might also dictate the addition of encasing ceramic material about the conductors and mass of insulating material to physically protect the operative elements of the sensor from surrounding materials that would chemically attack them at the range of temperatures being monitored.

It is a first object of the invention to provide an economical sensor capable of direct continuous monitoring of temperatures at very high ranges.

Another object of the invention is to provide a direct indication of very high temperatures in a device having no moving parts.

These and further objects will be evident from the following disclosure.

DESCRIPTION OF THE DRAWINGS

FIG. 1 is an elevational view of a first form of the invention;

FIG. 2 is a top view of the sensor shown in FIG. 1;

FIG. 3 is a sectional view taken along line 3—3 in FIG. 2;

FIG. 4 is a sectional view through the center of the second form of the invention;

FIG. 5 is a sectional view through a third form of the invention; and

FIG. 6 is a sectional view taken along line 6—6 in FIG. 5.

DESCRIPTION OF THE PREFERRED EMBODIMENTS

Illustrative forms of the disclosed device are set out in general detail in FIGS. 1, 4 and 5. Each includes a pair of high temperature electrical conductors whose melting points are above the range of very high temperatures which are to be monitored by the device. A portion of each conductor is separated from the other by a mass of electrical insulating material having a measurable resistivity change in relation to its temperature within the temperature range to be monitored. The sensor is a solid physical element that can be produced in very small sizes so as to be fitted within existing facilities without equipment modification. While the disclosure is particularly applicable to monitoring of temperatures adjacent to the fuel rods of nuclear reactors, it is to be understood that the high temperature sensor might be used in monitoring the temperature of any equipment where similar high ranges of operating temperatures might occur.

Referring to FIG. 1, the device shown comprises a short length of magnesium oxide cable fabricated with a tungsten sheath. It encases two transversely spaced parallel conductors, also made from tungsten. As an example of the physical dimensions involved, the sensor might have an outside diameter of 1/16 inch and a length of ¼ inch. In the drawings, the tungsten sheath is shown at 10. The two tungsten conductors are shown at 11 and 12. The intermediate magnesium oxide mass is shown at 13.

The conductors 11 and 12 are carried out of the sensing area and are insulated with ceramic beads 14. The two conductors 11 and 12 are adapted to be operatively connected to an electrical circuit capable of providing indications of the electrical resistivity between them. Such circuits are well known and no detailed description of them is believed necessary to an understanding of the present invention.

Magnesium oxide was chosen as an illurstrative example of the insulating material used between conductors 11 and 12 because it has a decreasing resistivity as temperature is increased. This resistivity change is measurable upwardly from a temperature of about 1000 K. (727° C.). Many other electrical insulative materials exhibit this property of resistivity changes in relation to temperature increases at high temperatures within the range of 1000 to 2000 K. The resistivity change is related to basic material properties. It can be changed by the presence of impurities in the insulating material, whether provided intentionally or by accident. Each material used between conductors 11 and 12 will require experimental calibration to accurately relate measured resistivity changes to temperature changes. It is to be understood that other insulating materials, including molten metal salts, can be used between conductors 11 and 12 so long as they exhibit measurable resistivity change in relation to temperature at the high temperature ranges to which this disclosure is directed.

FIG. 4 generally discloses a similar device or sensor encased within ceramic material 15. The covering of ceramic material 15 is provided to reduce the effects of outside environmental factors on the resistivity of the core material and to prevent attack on the sensor elements by environmental conditions. In FIG. 4, the sensor is shown as a sphere, but could similarly be constructed as a flattened disk. The insulating material 16 that separates the conductors 17 and 18 must again be temperature sensitive in the high temperature range being monitored. Magnesium oxide is again a practical example. Zirconium oxide is proposed as an alternative, since it is known to have linear resistance change in the temperature range of 1,000 to 2,000 K. The insulating material 16 in this instance would be unpacked or less dense than in normal extruded cable as shown in FIGS. 1 through 3. This considerably extends the upper temperature limits of the sensor by shifting the resistivity change to higher temperature levels.

FIGS. 6 and 7 show another form of the invention, built about a solid block of insulating material shown at 20. Opposed end surfaces 21, which are spaced apart from one another across the block of material, have layers of metal 22 and 23 deposited upon them and firmly bonded to their surface areas. The metal layers 22 and 23 might be deposited by flame spray techniques, by vapor deposition, or by other available processes. The block of insulating material, such as zirconium oxide, is provided with a pair of conductor leads 24 and 25 attached to the two layers of metal 22 and 23, respectively. Finally, the entire sensor is coated with a protective layer of ceramic material 26 having a moderate electrical function with respect to the operation of the sensor. The ceramic layer 26 provides a protective cover that isolates the operable elements of the sensor from the surrounding environment.

In general, this disclosure pertains to small solid sensors that provide direct indication of high temperature changes by measurement of resistivity changes between a pair of spaced conductors. The sensor is usable in very challenging high temperature environmental situations and can be manufactured or fabricated at relatively small cost. The resistivity changes of the insulating materials are related to the volume of insulation between the conductors, and the sizes must be kept relatively small in order to permit measurement of the resistivity changes in insulating materials such as generally described. The very small sensors can be placed along fuel rods or other elements where high temperature changes might occur, and do not require structural modification or clearance in order that the sensors be physically accommodated.

Changes can be made with respect to the details of the sensor without deviating from the basic structural and functional arrangement described above.

Having described my invention, I claim:

1. A high temperature sensor for monitoring changes in temperature within a range of 1000–2000° K., comprising:
   first and second electrical conductors each having a melting point above the temperature range to be monitored; said conductors being within a length of metal oxide sheathed cable; and
   a mass of electrical insulating material separating the conductors, said mass of insulating material having a measurable resistivity change in relation to its temperature within the temperature range to be monitored.

2. A sensor as set out in claim 1 wherein the conductors are two tungsten conductors within a length of magnesium oxide cable having a tungsten sheath.

3. A sensor as set out in claim 1 wherein the conductors are two tungsten conductors within a length of zirconium oxide cable having a tungsten sheath.

4. A high temperature sensor for monitoring changes in temperatures within a range of 1000–2000° K., comprising:
   first and second electrical conductors each having a melting point above the temperature range to be monitored;
   a mass electrical insulating material separating the conductors, said mass of electrical insulating material having a measurable resistivity change in relation to its temperature within the temperature range to be monitored; and
   a layer of ceramic material completely encasing the mass of electrical insulating material but allowing the first and second electrical conductors to extend therethrough.

5. The sensor of claim 4 further comprising at least one insulating ceramic bead positioned upon the electrical conductors at a location outside of the encasing layer of ceramic material.

6. The sensor of claim 4 further defined by said mass of electrical insulating material being substantially spherical in shape.

7. The sensor of claim 4 further defined by said mass of electrical insulative material being substantially disk-shaped.

8. The sensor of claim 4 wherein the conductors are two tungsten conductors within a mass of magnesium oxide.

9. The sensor of claim 4 wherein the conductors are two tungsten conductors within a mass of zirconium oxide.

* * * * *